United States Patent
Suzuki

(10) Patent No.: US 11,416,693 B2
(45) Date of Patent: Aug. 16, 2022

(54) WIRELESS-TAG WRITING APPARATUS, WIRELESS-TAG READING APPARATUS, AND TAG-INFORMATION WRITING METHOD

(71) Applicant: TOSHIBA TEC KABUSHIKI KAISHA, Tokyo (JP)

(72) Inventor: Shigeaki Suzuki, Gotemba Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/369,878

(22) Filed: Jul. 7, 2021

(65) Prior Publication Data
US 2022/0092279 A1    Mar. 24, 2022

(30) Foreign Application Priority Data
Sep. 23, 2020   (JP) .............................. JP2020-158547

(51) Int. Cl.
*G06K 19/06*    (2006.01)
*G06K 7/10*    (2006.01)

(52) U.S. Cl.
CPC ................................ *G06K 7/10366* (2013.01)

(58) Field of Classification Search
CPC .................................................. G06K 7/10366
USPC .................. 235/375, 492; 340/572.1–572.9, 340/10.1–10.6
See application file for complete search history.

(56) References Cited

U.S. PATENT DOCUMENTS

| 2007/0069860 A1* | 3/2007 | Akiyama | G06K 19/0723 235/492 |
| 2007/0126556 A1* | 6/2007 | Subramanian | G06K 19/0723 340/10.2 |
| 2007/0226145 A1* | 9/2007 | Ishigaki | H04L 63/0492 705/51 |
| 2012/0068831 A1 | 3/2012 | Shimura | |

FOREIGN PATENT DOCUMENTS

JP    2012-68769 A    4/2012

* cited by examiner

*Primary Examiner* — Jamara A Franklin
(74) *Attorney, Agent, or Firm* — Kim & Stewart LLP

(57) ABSTRACT

According to an embodiment, a wireless-tag writing apparatus counts the number of bits indicating a predetermined binary value of bits included in a first bit string to be written to a wireless tag. Further, the wireless-tag writing apparatus determines, in accordance with the counted number of bits, a second bit string indicating a unique serial number of the first bit string. Further, the wireless-tag writing apparatus determines the second bit string to issue tag information in which the number of bits indicating the predetermined binary value of all bits of the first bit string satisfies a predetermined condition.

10 Claims, 9 Drawing Sheets

WIRELESS-TAG WRITING APPARATUS, WIRELESS-TAG READING APPARATUS, AND TAG-INFORMATION WRITING METHOD

CROSS-REFERENCE TO RELATED APPLICATIONS

This application is based upon and claims the benefit of priority from the prior Japanese Patent Application No. 2020-158547, filed on Sep. 23, 2020, the entire contents of which are incorporated herein by reference.

FIELD

An embodiment to be described here generally relates to a wireless-tag writing apparatus, a wireless-tag reading apparatus, and a tag-information writing method.

BACKGROUND

In the past, a system for writing tag information including information for identifying an article such as a product to a memory of a wireless tag such as an RFID (Radio Frequency Identification) tag and reading the tag information from the memory of the wireless tag attached to the article to specify the article has been known.

As the memory of the wireless tag, a non-volatile memory mainly called a flash memory is used. In the flash memory, a garbled bit occurs due to the time degradation of a memory cell, impact effects, and the like in some cases. Here, the garbled bit means that a value different from that at the written time point is read, e.g., a binary value of the bit is changed from the value "0" to the value "1" or from the value "1" to the value "0". If a garbled bit occurs in the wireless tag, since tag information different from the written tag information is read, there is a possibility of erroneous registration in which an article different from the article to which the wireless tag is attached is registered.

DETAILED DESCRIPTION

Figure 1:
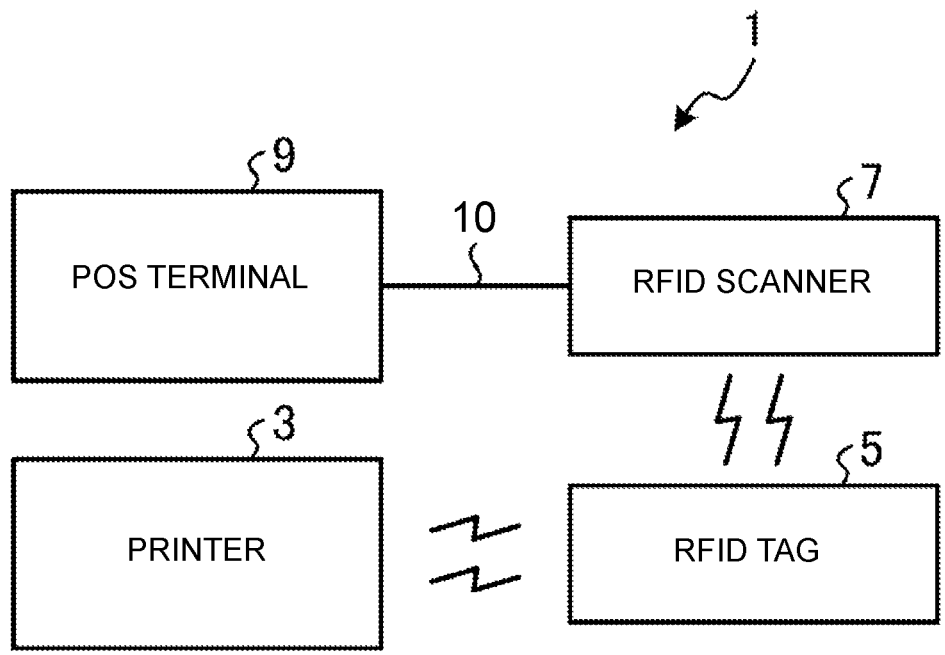
FIG. 1 is a diagram showing an example of a POS system (wireless-tag reading system) according to an embodiment.

According to an embodiment, a wireless-tag writing apparatus writes tag information to a wireless tag. The wireless-tag writing apparatus includes; a communication interface; a memory; and a processor. The communication interface receives tag information to be written to the wireless tag. The tag information includes a first bit string to which a plurality of bit strings is coupled, and the first bit string includes a second bit string indicating a unique serial number. The memory stores, in advance, a predetermined binary value included in the first bit string and a predetermined condition regarding the number of predetermined binary values included in the first bit string. The processor counts, in the first bit string of the tag information to be written received via the communication interface, the number of bits indicating the predetermined binary value stored in the memory. The processor determines, in accordance with the counted number of bits, the second bit string such that the number of bits indicating the predetermined binary value of all bits of the first bit string satisfies the predetermined condition stored in the memory, and issues tag information including the first bit string that includes the determined second bit string. Further, the processor writes the issued tag information including the first bit string to the wireless tag.

Hereinafter, a wireless-tag writing apparatus, a wireless-tag reading apparatus, and an information processing method according to an embodiment will be described. The same reference symbols in the drawings will denote the same or similar portions. The embodiment described below exemplifies an embodiment in which tag information regarding a product is written to a wireless tag and an embodiment in which the tag information is read from the wireless tag attached to the product, but the embodiment is not limited thereto. The technology according to the embodiment is applicable to various apparatuses, systems, methods, and programs according to an embodiment including at least one of processing of writing tag information to a wireless tag or processing of reading the tag information from the wireless tag.

FIG. 1 is a diagram showing an example of a configuration of a POS (Point of Sale System) system 1 according to the embodiment. As shown in FIG. 1, the POS system 1 includes a printer 3, an RFID tag 5, an RFID scanner 7, and a POS terminal 9. The RFID scanner 7 and the POS terminal 9 are connected to each other via a connection line 10 such as a USB (Universal Serial Bus) cable. However, they do not necessarily need to be wired connected to each other and may be wirelessly connected to each other. Note that the POS system 1 is an example of the wireless-tag reading system.

The printer 3 is, for example, a label printer that uses wireless communication to write tag information to the RFID tag 5 of a label sheet in a non-contact manner and prints visible information such as a character string on the surface (print surface) of the label sheet. Note that the printer 3 is an example of the wireless-tag writing apparatus.

As the label sheet of the printer 3, for example, a roll sheet in which label sheets are attached to the surface of a belt-shaped base sheet at equal intervals can be used. The belt-shaped base sheet is formed of a release paper or the like, and the label sheets are attached thereto so as to be peelable. The surface of the respective label sheets is the print surface of the visible information. Further, the RFID tag 5 is sealed on the back side (side of the adhesive surface with the base sheet) of the respective label sheets.

Note that the wireless-tag writing apparatus only needs to be an apparatus that uses wireless communication to write tag information to the RFID tag 5 in a non-contact manner, and may be a writing apparatus other than the printer 3.

Figure 2:
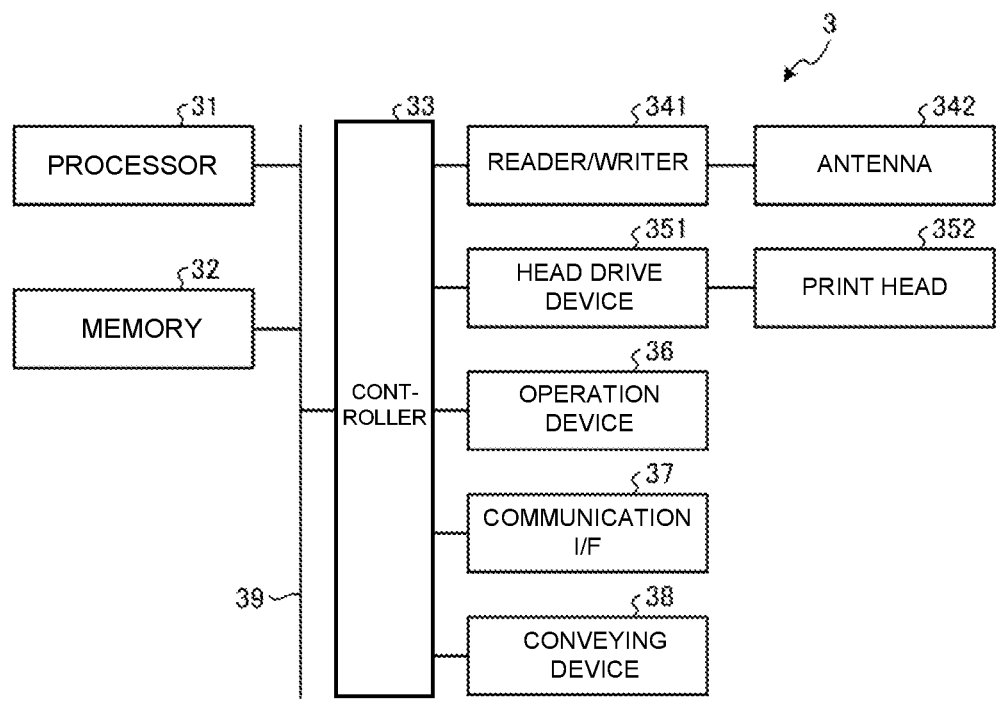
FIG. 2 is a block diagram showing an example of a hardware configuration of a printer (wireless-tag writing apparatus) according to the embodiment.

FIG. 2 is a block diagram showing an example of a hardware configuration of the printer 3 shown in FIG. 1. As shown in FIG. 2, the printer 3 includes a processor 31, a memory 32, a controller 33, a reader/writer 341, an antenna 342, a head drive device 351, a print head 352, an operation device 36, a communication interface (I/F) 37, and a conveying device 38. The processor 31, the memory 32, and the controller 33 are connected to each other via a bus 39.

The processor 31 reads various programs, data files, and the like stored in the ROM (Read Only Memory) or HDD (Hard Disk Drive) of the memory 32 and loads them into the RAM (Random Access Memory) of the memory 32. The processor 31 comprehensively controls the operation of the printer 3 in cooperation with the various programs, data files, and the like loaded into the RAM of the memory 32.

The controller 33 connects the processor 31 and the memory 32 to an input/output device that performs various settings and operation control of the printer 3. Specifically, the controller 33 is connected to the reader/writer 341, the head drive device 351, the operation device 36, the communication I/F 37, and the conveying device 38. The reader/writer 341 writes or reads tag information to/from the RFID tag 5 present in a communication area of a radio wave transmitted from the antenna 342. The reader/writer 341 is further connected to the antenna 342. The antenna 342 transmits a radio wave under the control of the reader/writer 341, and receives a response wave transmitted from the RFID tag 5 that has received this radio wave. Note that the response wave includes the serial number of the RFID tag 5 that is the transmission source. The print head 352 is driven by the head drive device 351 and prints various types of visible information on the surface of the label sheet conveyed by the conveying device 38. As the print head 352, for example, a thermal head can be used. The operation device 36 includes various keys, a display device, and the like. The operation device 36 receives an operation instruction such as setting of various parameters and calibration. The communication I/F 37 is an interface circuit for connecting to a host device such as a personal computer. The printer 3 receives, from the host device, tag information to be written to the RFID tag 5 via the communication I/F 37, print data to be printed on the label sheet, and the like. The conveying device 38 includes a drive source such as a motor, and conveys the label sheet under the control of the processor 31.

The RFID tag 5 is also called an IC tag or the like, and has a structure in which an IC chip and an antenna are incorporated in a thin film. The RFID tag 5 is a wireless tag in which electric power is generated when the antenna receives a radio wave and information (tag information in the embodiment) stored in a memory such as a flash memory in the IC chip is transmitted by the generated power. The RFID tag 5 has, for example, an adhesive surface and is adhered to an article with an adhesive force. Note that the RFID tag 5 may be attached to an article by a band or the like. Further, the RFID tag 5 may be attached to an article by being formed as a part of the package of the article, e.g., being embedded in the package of the article. Note that the RFID tag 5 is an example of the wireless tag.

The RFID scanner 7 reads tag information from the RFID tag 5 attached to an article such as a product. The RFID scanner 7 outputs the tag information read from the RFID tag 5 to the POS terminal 9 in response to an output request from the POS terminal 9. Note that the RFID scanner 7 is of a stationary type, for example, but may be realized as a portable handy type scanner. Note that the RFID scanner 7 is an example of the wireless-tag reading apparatus.

Figure 3:
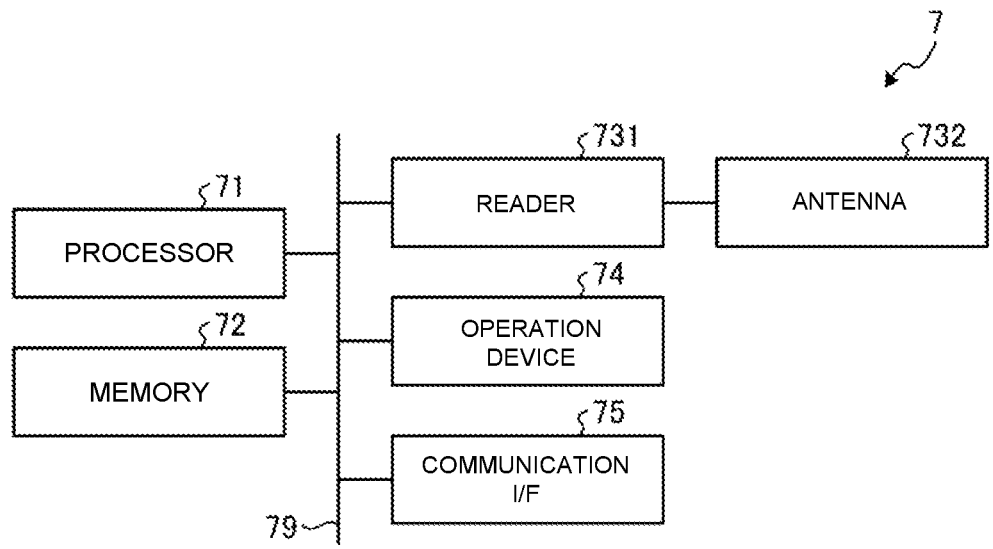
FIG. 3 is a block diagram showing an example of a hardware configuration of an RFID scanner (wireless-tag reading apparatus) according to the embodiment.

FIG. 3 is a diagram showing an example of a hardware configuration of the RFID scanner 7 shown in FIG. 1. As shown in FIG. 3, the RFID scanner 7 includes a processor 71, a memory 72, a reader 731, an antenna 732, an operation device 74, and a communication I/F 75. The processor 71, the memory 72, the reader 731, the operation device 74, and the communication I/F 75 are connected to each other via a bus 79 or the like.

The processor 71 reads various programs, data files, and the like stored in the ROM or HDD of the memory 72 and loads them into the RAM of the memory 72. The processor 71 comprehensively controls the operation of the RFID scanner 7 in cooperation with the various programs, data files, and the like loaded into the RAM of the memory 72.

The reader 731 transmits a modulated wave (radio wave) for reading tag information from the RFID tag 5 at predetermined time intervals (e.g., several tens of milliseconds) by using the antenna 732. Further, the reader 731 reads the tag information held by the RFID tag 5 via the antenna 732 and outputs the read tag information to the processor 71. The antenna 732 is connected to the reader 731. The antenna 732 is disposed in, for example, a substantially flat casing. A shopping basket housing products to be purchased by a customer is placed on the casing of the antenna 732. The antenna 732 outputs a radio wave capable of communicating with the RFID tag 5 upward, thereby performing communication for reading tag information with the RFID tag 5 of the respective products housed in the shopping basket. The operation device 74 includes various operation keys for receiving a user operation. The communication I/F 75 is an interface circuit for connecting to the POS terminal 9. The RFID scanner 7 is connected to the POS terminal 9 via the communication I/F 75.

The POS terminal 9 is a POS register for performing, on the basis of a product code read from a code symbol such as the RFID tag 5 and a bar code attached to a product purchased by a customer, processing of registering and paying for the product to be purchased. Specifically, the POS terminal 9 executes, on the basis of the product code included in the tag information read by the RFID scanner 7, processing relating to a transaction (commercial transaction) of a product corresponding to the product code. Further, the POS terminal 9 executes, on the basis of the product code indicated by the code symbol such as the bar code read by a code scanner 96, processing relating to a transaction (commercial transaction) of a product corresponding to the product code. The transaction means a series of procedures relating to the purchase of a product. More specifically, when a transaction is started, the POS terminal 9 acquires, by requesting the RFID scanner 7 to output tag information, the tag information read by the RFID scanner 7. The POS terminal 9 refers to a product master in which the product codes of the products sold in a store and the product information such as the product names and prices of the products are associated with each other, thereby specifying, as the product to be purchased, the product corresponding to the product code included in the tag information read by the RFID scanner 7.

Figure 4:
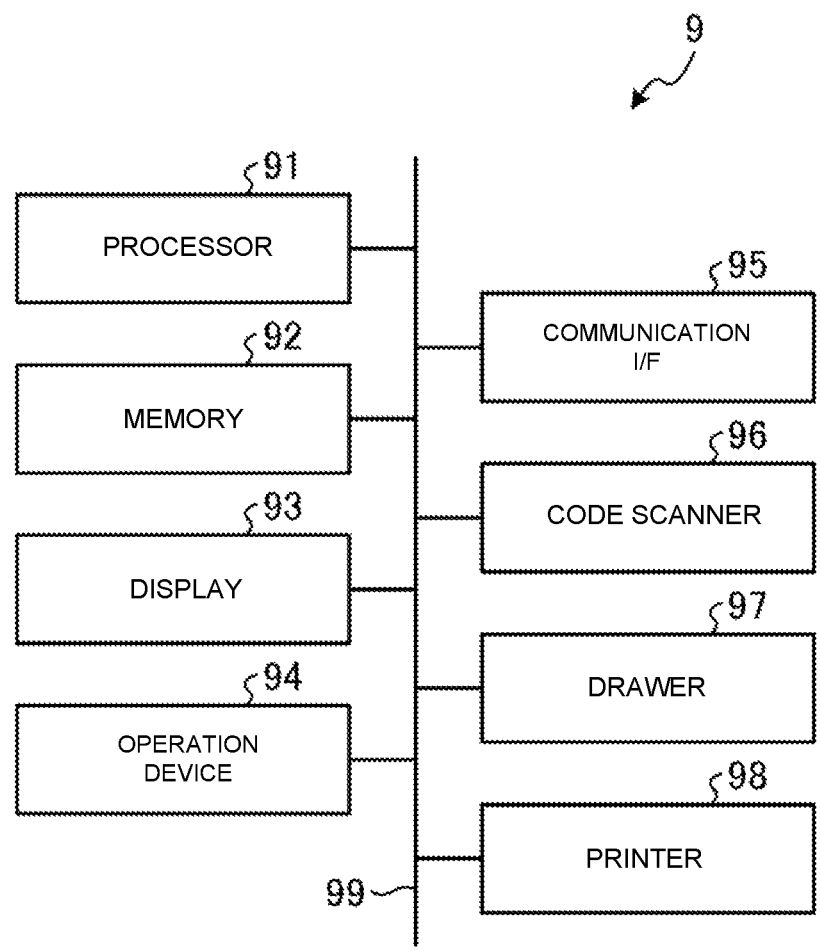
FIG. 4 is a block diagram showing an example of a hardware configuration of a POS terminal according to the embodiment.

FIG. 4 is a diagram showing an example of a hardware configuration of the POS terminal 9 in FIG. 1. As shown in FIG. 4, the POS terminal 9 includes a processor 91, a memory 92, a display 93, an operation device 94, a communication I/F 95, a code scanner 96, a drawer 97, and a printer 98. The processor 91, the memory 92, the display 93, the operation device 94, the communication I/F 95, the code scanner 96, the drawer 97, and the printer 98 are connected to each other via a bus 99 or the like.

The processor 91 reads various programs, data files, and the like stored in the ROM or HDD of the memory 92 and loads them into the RAM of the memory 92. The processor 91 comprehensively controls the operation of the POS terminal 9 in cooperation with the various programs, data files, and the like loaded into the RAM of the memory 92.

The display 93 is a display such as a Liquid Crystal Display (LCD), and displays various types of information such as a breakdown of transactions. The operation device 94 includes various operation keys such as a numeric keypad, a transaction start key, and a payment start key, and receives a user operation. The communication I/F 95 is an interface circuit for connecting to the RFID scanner 7 and to the outside of the POS system 1. The code scanner 96 reads, for example, a code symbol such as a bar code attached to a product to which the RFID tag 5 is not attached. The code symbol holds, for example, a product code for identifying the type of the product. The drawer 97 is provided at, for example, the lower portion of the main body of the POS terminal 9, and houses coins and bills. The printer 98 prints a receipt such as an acknowledgement and discharges the printed receipt from a receipt discharge port provided in the main body of the POS terminal 9. Note that the code scanner 96, the drawer 97, and the printer 98 do not necessarily need to be provided on the POS terminal 9, and may be provided outside the POS terminal 9 and connected via the communication I/F 95.

Note that as each of the processors 31, 71, and 91, for example, a CPU (Central Processing Unit) is used, but another processor such as a GPU (Graphics Processing Unit), an ASIC (Application Specific Integrated Circuit), and FPGA (Field Programmable Gate Array) may be used.

The RAM of each of the memories 32, 72, and 92 is used as a working memory, and is a volatile memory in which data is stored when the processors 31, 71, and 91 execute arithmetic processing, respectively. Further, the ROM and HDD of each of the memories 32, 72, and 92 are volatile memories for storing a program such as a control program executed by the processors 31, 71, and 91, respectively, and data such as a parameter. Note that as each of the memories 32, 72, and 92, for example, a RAM, a ROM, or an HDD is used, but another non-volatile memory such as an SSD (Solid State Drive) and a flash memory may be used.

Note that at least two of the printer 3, the RFID scanner 7, and the POS terminal 9 may be integrated. As an example, the RFID scanner 7 and the POS terminal 9 may be configured as one apparatus.

Figure 5:
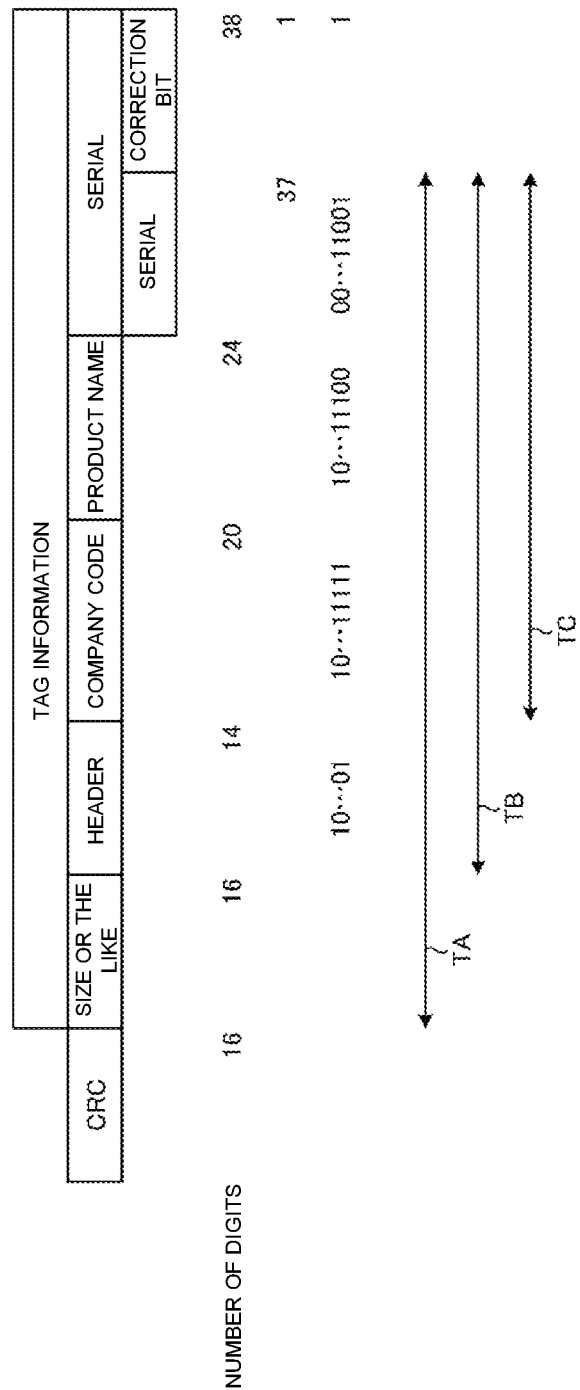
FIG. 5 is a diagram describing an example of wireless tag information according to the embodiment.

FIG. 5 is a diagram describing an example of tag information according to the embodiment. FIG. 5 illustrates tag information in the form of SGTIN (Serialized Global Trade Item Number) as an example.

As shown in FIG. 5, the tag information is constructed by coupling a plurality of binary-format bit strings representing items of information indicating a size or the like, a header, a company code, a product name, and a serial. The information indicating a size or the like is a 16-bit binary value indicating the data size or the like of each piece of information included in the tag information. The header is a 14-bit binary value for identifying the data format of the tag information. For example, in the tag information illustrated in FIG. 5, the header stores a value for identifying that the data format of the tag information is SGTIN-96. The company code is a 20-bit binary value for indicating the code that indicates the operator. The product name is a 24-bit binary value for indicating the code that indicates the product. Note that the set of the company code and the product name corresponds to the product code in the embodiment. The serial is a 38-bit binary value for indicating a unique serial number for each of a plurality of RFID tags 5. The bit string indicating the serial number includes a 1-bit correction bit. Note that the correction bit is an example of a bit for parity correction. As described above, the plurality of binary-format bit strings representing a plurality of items is coupled. Further, the coupled bit strings constitute tag information. Hereinafter, the bit string constituting tag information will be referred to as the first bit string. Further, the bit string indicating the seral number will be described as the second bit string.

Figure 6:
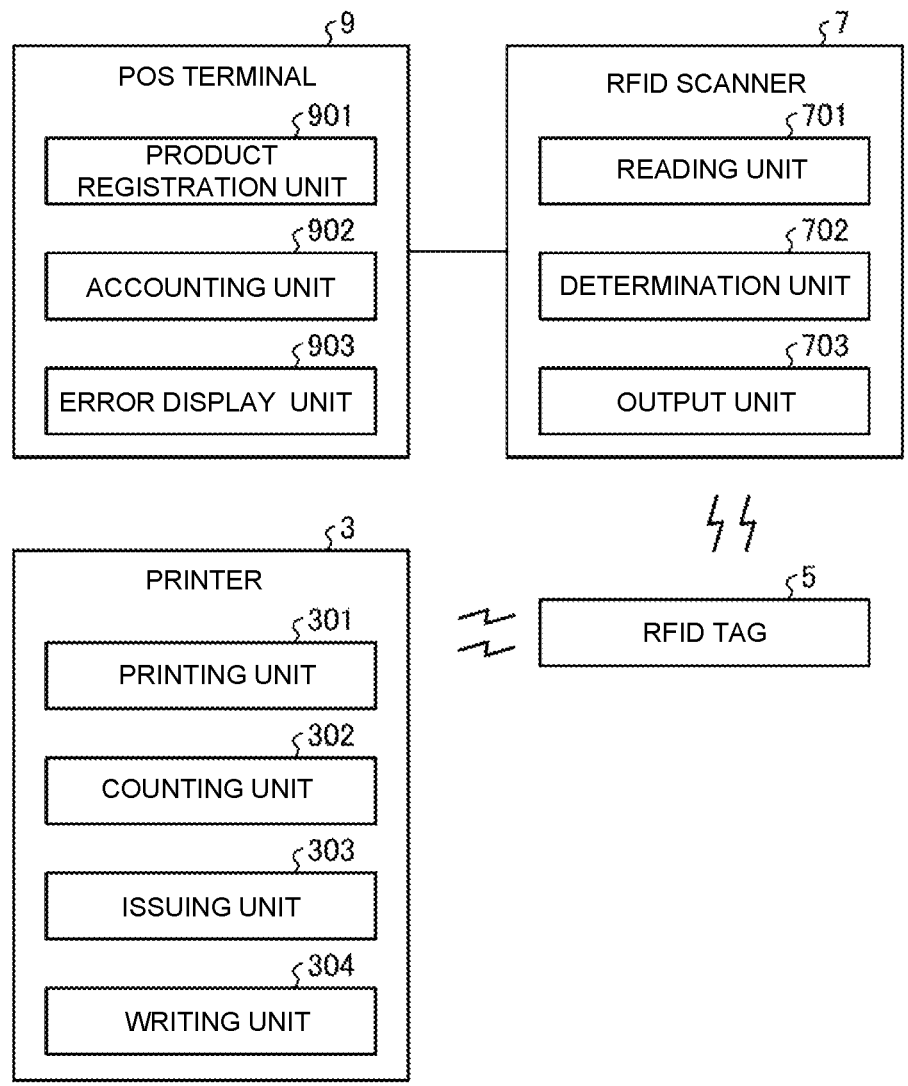
FIG. 6 is a diagram showing an example of a functional configuration of the POS system according to the embodiment.

FIG. 6 is a diagram showing an example of a functional configuration of the POS system 1 shown in FIG. 1. Note that a part or all of the functions realized by each apparatus of the POS system 1 may be realized by cooperation of two or more apparatuses, or may be realized by a hardware configuration such as a dedicated circuit mounted on each apparatus.

The processor 31 of the printer 3 executes a control program loaded into the RAM of the memory 32 to realize functions of a printing unit 301, a counting unit 302, an issuing unit 303, and a writing unit 304.

The printing unit 301 controls the head drive device 351 and the conveying device 38 to print various types of visible information on the surface of the label sheet.

The counting unit 302 counts the number of bits (bit number) indicating a predetermined binary value of all bits of the first bit string to be written to the RFID tag 5. Assumption is made that the predetermined binary value is preset and stored in the memory 32 or the like. As the predetermined binary value, a value "1" or a value "0" can be used as appropriate.

The issuing unit 303 issues tag information such that the number of bits of the predetermined binary value counted by the counting unit 302 satisfies a predetermined condition. Note that the predetermined condition represents that the number of bits of the predetermined binary value is a specified parity. That is, the issuing unit 303 issues tag information such that the number of bits of the predetermined binary value counted by the counting unit 302 is the specified parity. Note that assumption is made that the specified parity is preset and stored in the memory 32 or the like. The specified parity is a parity determined in advance, and is an even number or an odd number. Specifically, the issuing unit 303 determines the second bit string indicating the serial number unique to the RFID tag 5 in accordance with the number of bits of the predetermined binary value counted by the counting unit 302. In the case where the counted number of bits is not the specified parity, the issuing unit 303 changes the binary value of the correction bit of the second bit string such that the number of bits of the predetermined binary value of the first bit string is the specified parity. In other words, the issuing unit 303 determines the second bit string such that the number of bits indicating the predetermined binary value of the first bit string is the specified parity. Further, the issuing unit 303 issues tag information including the first bit string that includes the determined second bit string.

The writing unit 304 controls the reader/writer 341 to write the tag information from the issuing unit 303 to the RFID tag 5 by the radio wave from the antenna 342.

When receiving a radio wave for writing the tag information from the printer 3, the RFID tag 5 stores the received tag information in the internal memory, creates a CRC check code for the stored tag information in the memory, and further stores the created CRC check code. Further, when receiving a radio wave for reading the tag information from the RFID scanner 7, the RFID tag 5 re-creates a CRC check code for the tag information in the memory at the time point of the reception and updates the value of the CRC check code.

The processor 71 of the RFID scanner 7 executes the control program loaded into the RAM of the memory 72 to realize functions of a reading unit 701, a determination unit 702, and an output unit 703.

The reading unit 701 reads tag information from the RFID tag 5 by a radio wave from the RFID tag 5 in accordance with the radio wave from the antenna 732.

The determination unit 702 counts the number of bits indicating the predetermined binary value of all bits of the bit string of the read tag information. Further, in the case where the counted number of bits is not the specified parity, the determination unit 702 determines that the read tag information is invalid. In the case where it is determined that the read tag information is invalid, the output unit 703 outputs an error notification notifying a read error to the POS terminal 9 or the like.

In the case where the read tag information is not invalid, the output unit 703 outputs the read tag information or the product code included in the tag information to the POS terminal 9.

The processor 91 of the POS terminal 9 executes a control program loaded into the RAM of the memory 92 to realize functions of a product registration unit 901, an accounting unit 902, and an error display unit 903. The product registration unit 901 performs, on the basis of the product code included in the tag information from the RFID scanner 7, product registration processing for registering the product read by the RFID scanner 7 as the product to be purchased. The accounting unit 902 performs accounting processing relating to the product registered by the product registration unit 901. The error display unit 903 displays, when receiving an error notification from the RFID scanner 7, information indicating that a read error has occurred, on the display 93.

Hereinafter, the flow of processes executed by the POS system 1 according to the embodiment will be described with reference to the drawings.

Hereinafter, for the sake of simplicity, assumption is made that the predetermined binary value is a value "1". Further, assumption is made that the specified parity is an even number. Further, assumption is made that the initial value of the binary value of the correction bit is a value "0". Note that the predetermined binary value and the specified parity are shared in the POS system 1 and preset and stored in the memories 32, 72, and 92 or the like of the respective apparatuses.

Figure 7:
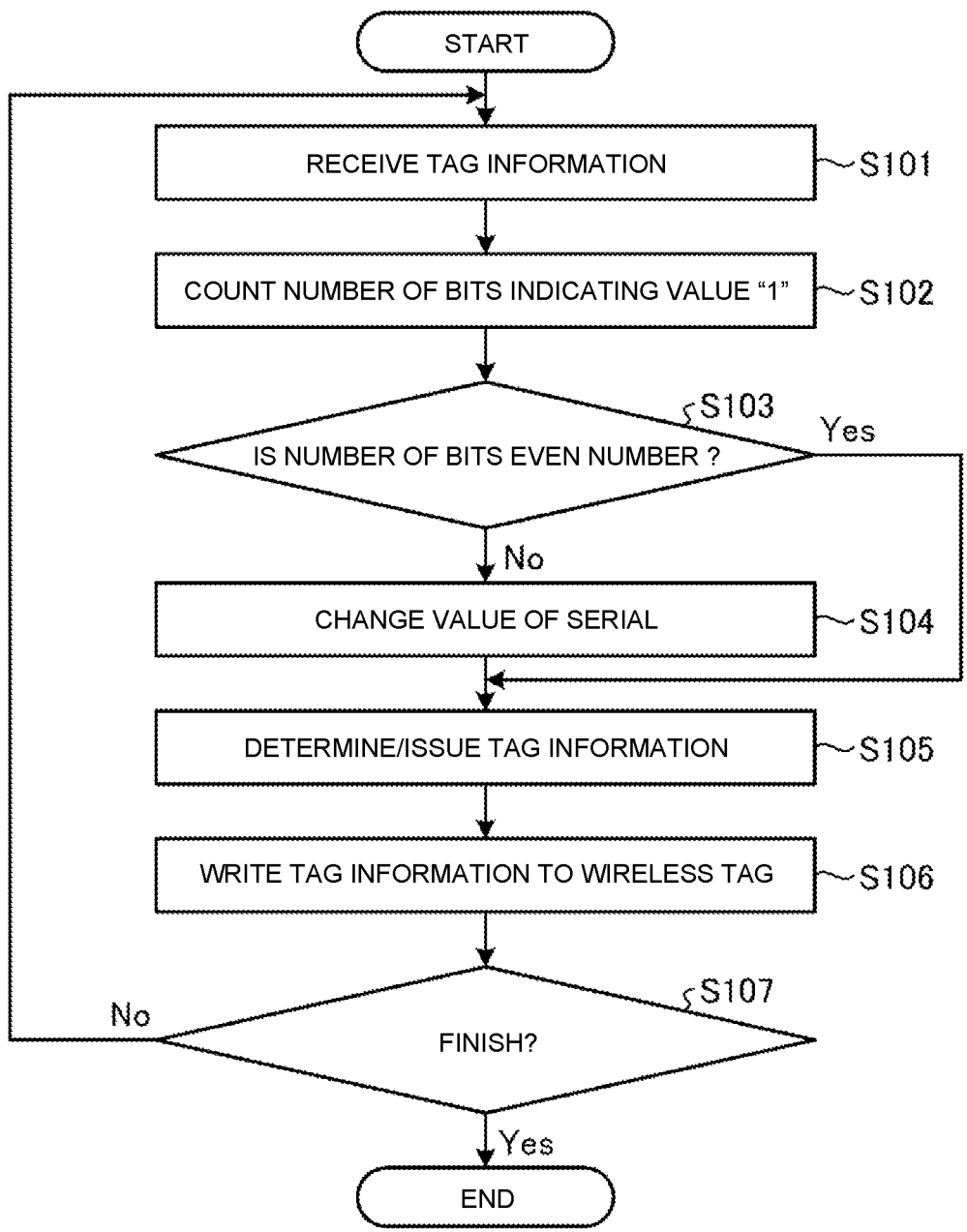
FIG. 7 is a flowchart showing an example of writing processing executed by the printer according to the embodiment.

FIG. 7 is a flowchart showing an example of writing processing executed by the printer 3 shown in FIG. 1. The writing processing in FIG. 7 and the printing processing of printing various types of visible information on the surface of the label sheet are executed as a series of flows, for example.

In Step S101 of FIG. 7, the issuing unit 303 of the processor 31 receives, via the communication I/F 37, tag information to be written to the RFID tag 5 from the host device. Subsequently, in Step S102, the counting unit 302 of the processor 31 counts the number of bits indicating the value "1" (predetermined binary value) of all bits of the binary-format first bit string constituting the tag information. Subsequently, in Step S103, the issuing unit 303 determines whether or not the counted number of bits is an even number.

In the case where it is determined that the counted number of bits is not an even number of the specified parity, i.e., the counted number of bits is an odd number (Step S103: No), the processing of the processor 31 proceeds to Step S104. In Step S104, the issuing unit 303 of the processor 31 changes the binary value of the correction bit from "0" to "1" and determines the second bit string in which the binary value of the correction bit is changed. Subsequently, in Step S105, the issuing unit 303 issues, as tag information to be written to the RFID tag 5, tag information including the first bit string that includes the determined second bit string.

Meanwhile, in the case where it is determined in Step S103 that the counted number of bits is an even number of the specified parity (Step S103: Yes), the processing of the processor 31 proceeds to Step S105. In Step S105, the issuing unit 303 of the processor 31 issues the received tag information as tag information to be written to the RFID tag 5 without changing the binary value of the correction bit.

Subsequently, in Step S106, the writing unit 304 of the processor controls the reader/writer 341 to write the tag information from the issuing unit 303 to the RFID tag 5 by the radio wave from the antenna 342.

Subsequently, in Step S107, the issuing unit 303 of the processor 31 determines whether or not the writing process is to be finished. In the determination in Step S107, it is determined that the writing processing is to be finished, for example, in the case where a notification for finishing the writing processing is received from the host device or where a time-out occurs before receiving the next tag information to be written to the RFID tag 5. In the case where it is determined that the writing processing is not finished (Step S107: No), the processing of the processor 31 returns to Step S101. Meanwhile, in the case where it is determined in Step S107 that the writing processing is to be finished (Step S107: Yes), the processor 31 finishes the writing processing of FIG. 7.

Figure 8:
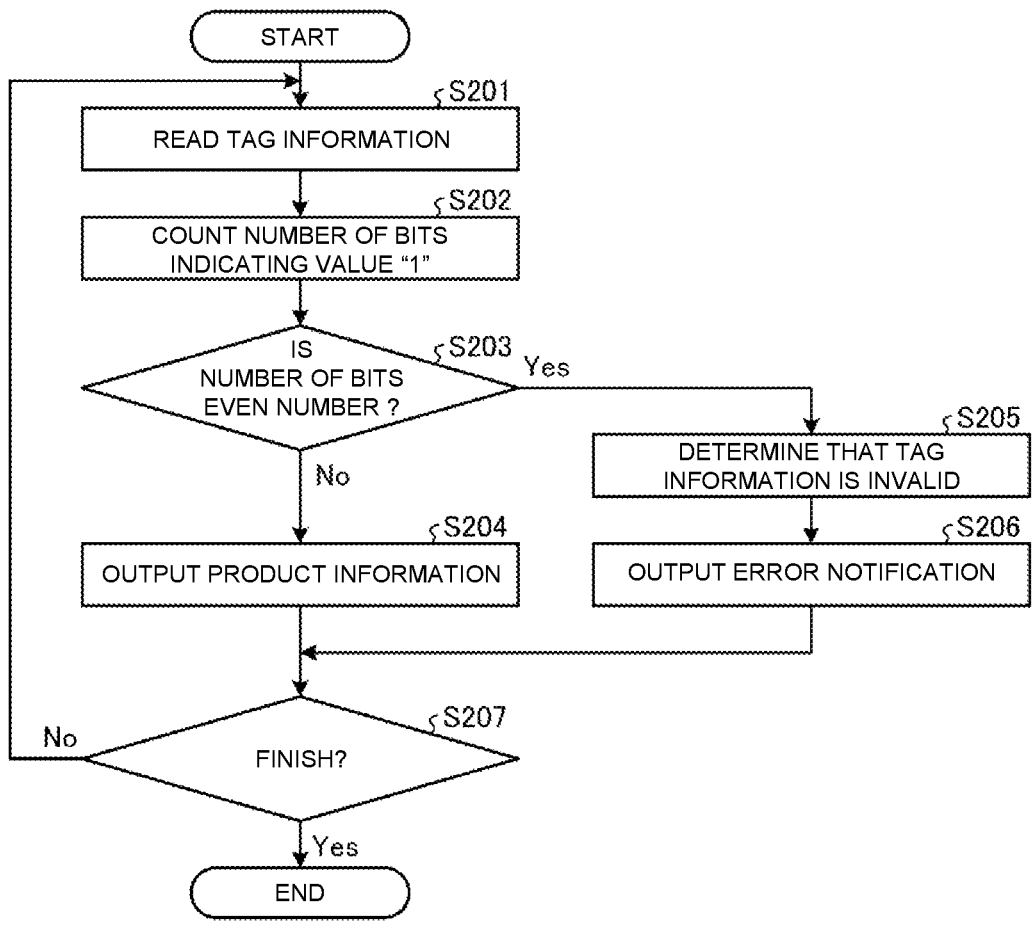
FIG. 8 is a flowchart showing an example of reading processing executed by the RFID scanner according to the embodiment.

FIG. 8 is a flowchart showing an example of the reading processing executed by the RFID scanner 7 shown in FIG. 1.

In Step S201 of FIG. 8, the reading unit 701 of the processor 71 reads tag information from the RFID tag 5 by the radio wave from the RFID tag 5 in accordance with the radio wave from the antenna 732. Subsequently, in Step S202, the determination unit 702 of the processor 71 counts the number of bits indicating the value "1" of all bits of the first bit string of the read tag information.

Subsequently, in Step S203, the determination unit 702 of the processor 71 determines whether or not the counted number of bits is an even number. In the case where it is determined that the counted number of bits is an even number of the specified parity (Step S203: Yes), the processing of the processor 31 proceeds to Step S204. In Step S204, the output unit 703 of the processor 31 outputs the read tag information or the product code included in the tag information to the POS terminal 9.

Meanwhile, in the case where it is determined that the counted number of bits is not an even number of the specified parity, i.e., the counted number of bits is an odd number (Step S203: No), the processing of the processor 71 proceeds to Step S205. That is, in the case where the counted number of bits does not satisfy the predetermined condition, the processing of the processor 71 proceeds to Step S205. In Step S205, the determination unit 702 of the processor 71 determines that the read tag information is invalid. Subsequently, in Step S206, the output unit 703 of the processor 71 outputs an error notification for notifying a read error to the POS terminal 9 or the like.

After the processing of Step S204 and after the processing of Step S206, the processing of the processor 71 proceeds to Step S207. In Step S207, the reading unit 701 of the processor 71 determines whether or not the reading processing is to be finished. In the determination in Step S207, for example, it is determined that the reading processing is to be finished in the case where a notification for finishing the reading processing is received from the POS terminal 9 or where a time-out occurs before receiving the next tag information. In the case where it is determined that the reading processing is not to be finished (Step S207: No), the processing of the processor 71 returns to Step S201. Meanwhile, it is determined in Step S207 that the reading processing is to be finished (Step S207: Yes), the processor finishes the processing in FIG. 8.

Figure 9:
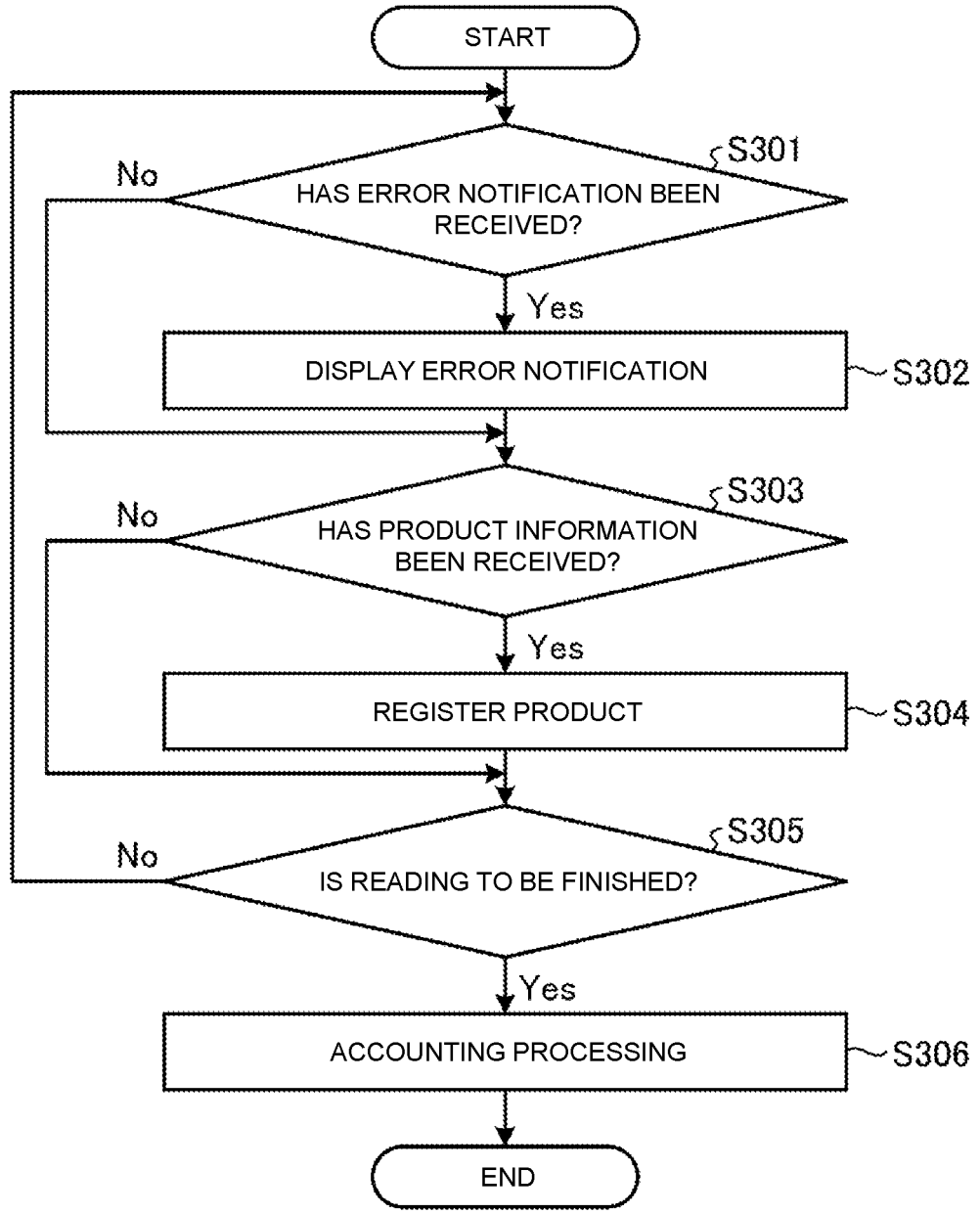
FIG. 9 is a flowchart showing an example of product registration processing executed by the POS terminal according to the embodiment.

FIG. 9 is a flowchart showing an example of the product registration processing executed by the POS terminal 9 shown in FIG. 1. The product registration processing shown in FIG. 9 is executed for each transaction, for example.

In Step S301 in FIG. 9, the error display unit 903 of the processor 91 determines whether or not an error notification from the RFID scanner 7 has been received. In the case where it is determined that an error notification from the RFID scanner 7 has been received (Step S301: Yes), the processing of the processor 91 proceeds to Step S302. In Step S302, the error display unit 903 displays, the display 93, information indicating that a read error has occurred. Meanwhile, in the case where it is determined in Step S301 that an error notification from the RFID scanner 7 has not been received (Step S301: No) or after the processing of Step S302, the processing of the processor 91 proceeds to the processing of Step S303.

In Step S303, the product registration unit 901 of the processor 91 determines whether or not product information has been received. Note that as the product information, the tag information read by the RFID scanner 7 or the product code included in the tag information and the product code indicated by the code symbol read by the code scanner 96 can be used as appropriate. In the case where it is determined that product information has been received (Step S303: Yes), the processing of the processor 91 proceeds to Step S304. In Step S304, the product registration unit 901 specifies, on the basis of in the received product information, a product to be purchased, and performs product registration processing for registering the specified product. Meanwhile, it is determined in Step S303 that product information has not been received (Step S303: No) or after the processing of Step S304, the processing of the processor 91 proceeds to the processing of Step S305.

In Step S305, the accounting unit 902 of the processor 91 determines whether or not the reading is to be finished. In the determination in Step S305, for example, in the case where the payment start key of the operation device 94 is operated, it is determined that the reading is to be finished. In the case where it is determined that the reading is not to be finished (Step S305: No), the processing of the processor 91 returns to Step S301. Meanwhile, in the case where it is determined in Step S305 that the reading is to be finished (Step S305: Yes), the processing of the processor 91 proceeds to Step S306. In Step S306, the processor 91 performs accounting processing. After that, the product registration processing in FIG. 9 is finished.

As described above, the printer 3 according to the embodiment changes the parity of the total number of bits of the predetermined binary value of all bits constituting tag information to be issued by changing the value to be assigned to the RFID tag 5 as the serial number. That is, the printer issues tag information such that the total number (bit number) of bits of the predetermined binary value of all bits constituting tag information to be issued is a predetermined parity (specified parity).

In accordance with this embodiment, in the RFID tag 5 to which tag information has been written by the printer 3, the total number of bits of the predetermined binary value of all bits constituting tag information can be fixed to a predetermined specified parity. Therefore, unlike the CRC check code that is recalculated in accordance with the tag information at the time point, it is possible to detect that tag information has changed by one bit. In other words, it is possible to detect whether or not a garbled bit has occurred in one of bits constituting tag information. Therefore, in accordance with the printer 3 according to the embodiment, it is possible to suppress erroneous registrations of products due to a garbled bit of the RFID tag 5.

Further, the printer 3 according to the embodiment changes the bit string indicating the serial number unique to the RFID tag 5 of all bits constituting tag information to be issued, when changing the parity of the total number of bits of the predetermined binary value of all the bits constituting tag information. Specifically, in the tag information according to the embodiment, the bit string indicating the serial number includes a correction bit for parity correction. The printer 3 changes the parity of the total number of bits of the predetermined binary value of all bits constituting tag information to be issued by changing the binary value of the correction bit. In accordance with this configuration, it is possible to change the value to be assigned to the RFID tag 5 as a serial number.

Further, the POS system 1 according to the embodiment includes the printer 3 and the RFID scanner 7. Note that in the POS system 1, the predetermined binary value and the specified parity are shared. The RFID scanner 7 counts the number of bits indicating the predetermined binary value in the same manner as the printer 3 with respect to the tag information read from the RFID tag 5 and determines whether or not the parity of the counted number of bits is the specified parity. The RFID scanner 7 determines, in the case where the parity of the counted number of bits is not the specified parity, that the read tag information is invalid and discards it. Note that the tag information is issued tag information such that the number of bits indicating the predetermined binary value of all bits of the first bit string to be written to the RFID tag 5 satisfies the predetermined condition. Further, the tag information is tag information in which the second bit string indicating a unique serial number of the first bit string is determined in accordance with the number of bits indicating he predetermined binary value of the bits included in the first bit string. Since the RFID tag 5 is a wireless tag to which such tag information is written, it is possible to suppress erroneous registration of products due to a garbled bit of the tag information of the RFID tag 5.

Further, in the POS system 1 according to the embodiment, the RFID scanner 7 outputs an error notification in the case where the parity of the counted number of bits is not the specified parity, and outputs product information in the case where the parity of the counted number of bits is the specified parity. Further, the POS system 1 further includes the POS terminal 9 that receives an error notification or product information from the RFID scanner 7. In accordance with the error notification from the RFID scanner 7, the POS terminal 9 performs error display for notifying a user of a failure of the RFID scanner 7 or notifying a user of occurrence of a read error. In accordance with this embodiment, since a user can recognize the occurrence of a garbled bit of tag information of the RFID tag 5, the user can input an appropriate product code to the POS terminal 9 by another means.

Note that although the above-mentioned embodiment exemplifies a case where items such as a size or the like, a header, a company code, a product name, and a serial are used as targets for which the number of bits of the predetermined binary value (e.g., "1") is counted, as indicated by an arrow TA in FIG. 5, the embodiment is not limited to this case. That is, the first bit string of the counting target (to be written) is not necessarily need to be all bit strings constituting tag information. For example, the items of a header, a company code, a product name, and a serial may be used as the counting target as indicated by an arrow TB in FIG. 5, or the items of a company code, a product name, and a serial may be used as indicated by an arrow TC in FIG. 5. Further, in the bit string of the counting target, the item of the serial may be a bit including a correction bit (38 bits in the example of FIG. 5) or a bit excluding the correction bit (37 bits in the example of FIG. 5). Note that whether or not the correction bit is included in the bit string of the counting target may be appropriately determined in accordance with, for example, the initial value of the binary value of the parity specification and the correction bit, the determination formula of the parity determination of the counting result, and the like. Even in these embodiments, the same effects as those in the above-mentioned embodiments can be achieved.

Further, in the case where a predetermined condition is satisfied, e.g., the parity is predetermined for the bit string of the second bit string excluding the correction bit, the counting target in the writing processing does not necessarily include the item of the serial. Note that the case where the parity is predetermined for the bit string of the second bit string excluding the correction bit represents, for example, a case where only one-skipped serial numbers of even numbers or odd numbers among the serial numbers that can be represented by the second bit string are used.

Note that although the above-mentioned embodiment exemplifies the case where one bit at the end of the second bit string indicating the serial number is the correction bit as shown in FIG. 5, the embodiment is not limited to this case. The correction bit may be one bit at the top of the second bit string, or may be a bit at another arbitrary position other than the head and end of the second bit string. Even in these embodiments, the same effects as those in the above-mentioned embodiment can be achieved.

Although the above-mentioned embodiment exemplifies the case where one bit of the second bit string indicating the serial number is used as the correction bit, the embodiment is not limited to this case. Two or more bits may be used as correction bits. The number of bits to be used as the correction bit may be appropriately determined in accordance with the balance between the number of bits that can be detected as the bit in which a garbled bit has occurred and the number required as a valid serial number. As an example, in the case of using two bits of the second bit string indicating the serial number as the correction bits, the processor 31 (issuing unit 303) issues tag information in which the number of bits indicating the predetermined binary value is congruent with a predetermined designated value of 0, 1, 2, or 3 using 4 as a modulus. In other words, the issuing unit 303 issues tag information such that the number of bits indicating the predetermined binary value is a predetermined designated value having the remainder when divided by 4. Note that the number of bits indicating the predetermined binary value being a predetermined designated value having the remainder when divided by 4 is an example of the predetermined condition. Note that assumption is made that the predetermined binary value and the designated value are shared in the POS system 1, and are preset and stored in the memories 32, 72, and 92 or the like of the respective apparatuses. Note that in the case where two bits of the second bit string indicating the serial number are used as the correction bits, the determination with the parity and the determination with a congruent value using 4 as a modulus can be combined. For example, a determination method such as executing, in the case where a determination is made as a read error in the determination with the parity, a determination with a congruent value using 4 as a modulus can be realized. Even in these embodiments, it is possible to change the value to be assigned to the RFID tag 5 as a serial number. Further, even in the case where garbled bits have occurred in two or more bits, the garbled bits can be detected while the number of valid serial numbers is reduced, and thus, it is possible to more reliably suppress erroneous registration of products due to a garbled bit of the RFID tag 5.

Note that as a candidate value (bit string) to be assigned to the RFID tag 5 as a serial number, a set of two bit strings having the numbers of bits indicating the predetermined binary value, which are different from each other, may be prepared in advance. In this case, the processor 31 (issuing unit 303) determines a value (second bit string) to be assigned to the RFID tag 5 as a serial number from the two bit strings in accordance with the counted number of bits. Alternatively, as a candidate value (bit string) to be assigned to the RFID tag 5 as a serial number, a set of four bit strings having the numbers of bits indicating the predetermined binary value of 0, 1, 2 or 3 using 4 as a modulus, which are different from each other, may be prepared in advance. Even in these embodiments, it is possible to change the value to be assigned to the RFID tag 5 as a serial number.

In accordance with at least one embodiment described above, it is possible to suppress erroneous registration of products due to a garbled bit of the RFID tag 5.

Note that the control program executed by each of the respective apparatus according to this embodiment (the printer 3, the RFID scanner 7, and the POS terminal 9) is incorporated in a ROM or the like in advance and provided.

The control program executed by each of the respective apparatus according to this embodiment (the printer 3, the RFID scanner 7, and the POS terminal 9) may be recorded on a computer-readable recording medium such as a CDROM, a flexible disk (FD), a CD-R, and a DVD (Digital Versatile Disk) as a file in an installable or executable format and provided.

Further, the control program executed by each of the respective apparatus according to this embodiment (the printer 3, the RFID scanner 7, and the POS terminal 9) may be stored on a computer connected to a network such as the Internet and provided by being downloaded through the network. Further, the control program executed by each of the respective apparatus according to this embodiment (the printer 3, the RFID scanner 7, and the POS terminal 9) may be provided or distributed over a network such as the Internet.

The control program executed by the printer 3 according to this embodiment has a modular configuration including the above-mentioned respective units (the printing unit 301, the counting unit 302 the issuing unit 303, and the writing unit 304). The CPU (the processor 31) reads the control program from the above-mentioned storage medium and loads the above-mentioned respective units into the main storage device. As a result, the printing unit 301, the counting unit 302, the issuing unit 303, and the writing unit 304 are generated on the main storage device.

The control program executed by the RFID scanner 7 according to this embodiment has a modular configuration including the above-mentioned respective units (the reading unit 701, the determination unit 702, and the output unit 703). The CPU (the processor 71) reads the control program from the above-mentioned recording medium and loads the above-mentioned respective units into the main storage device. As a result, the reading unit 701, the determination unit 702, and the output unit 703 are generated on the main storage device.

The control program executed by the POS terminal 9 according to this embodiment has a modular configuration including the above-mentioned respective units (the product registration unit 901, the accounting unit 902, and the error display unit 903). The CPU (the processor 91) reads the control program from the above-mentioned recording medium and loads the above-mentioned respective units into the main storage device. As a result, the product registration unit 901, the accounting unit 902m and the error display unit 903 are generated on the main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless-tag writing apparatus that writes tag information to a wireless tag, comprising:
   a communication interface that receives tag information to be written to the wireless tag, the tag information including a first bit string to which a plurality of bit strings is coupled, the first bit string including a second bit string indicating a unique serial number;
   a memory that stores, in advance, a predetermined binary value included in the first bit string and a predetermined condition regarding the number of predetermined binary values included in the first bit string; and
   a processor configured to
      count, in the first bit string of the tag information to be written received via the communication interface, the number of bits indicating the predetermined binary value stored in the memory,
      determine, in accordance with the counted number of bits, the second bit string such that the number of bits indicating the predetermined binary value of all bits of the first bit string satisfies the predetermined condition stored in the memory, and issue tag information including the first bit string that includes the determined second bit string, and
      write the issued tag information including the first bit string to the wireless tag.

2. The wireless-tag writing apparatus according to claim 1, wherein
   the second bit string includes one bit for parity correction.

3. The wireless-tag writing apparatus according to claim 2, wherein
   the predetermined condition is a predetermined parity in which the number of bits indicating the predetermined binary value is predetermined.

4. The wireless-tag writing apparatus according to claim 2, wherein
   the processor determines, in accordance with the counted number of bits, a binary value of the bit for parity correction of the second bit string to set the number of bits indicating the predetermined binary value of all bits of the first bit string such that the predetermined condition stored in the memory is satisfied.

5. The wireless-tag writing apparatus according to claim 3, wherein
   the processor determines, in accordance with the counted number of bits, a binary value of the bit for parity correction to set a parity of the number of bits indicating the predetermined binary value of all bits of the first bit string to the predetermined parity.

6. The wireless-tag writing apparatus according to claim 1, wherein
   the second bit string includes two bits for parity correction, and
   the predetermined condition is a predetermined designated value having a remainder of 0, 1, 2, or 3 obtained by dividing the number of bits indicating the predetermined binary value by 4.

7. The wireless-tag writing apparatus according to claim 6, wherein
   the processor determines, in accordance with the counted number of bits, a binary value of the bit for parity correction to set the remainder obtained by dividing the number of bits indicating the predetermined binary value of all bits of the first bit string by 4 to the predetermined designated value.

8. The wireless-tag writing apparatus according to claim 7, wherein
   a bit string of the second bit string excluding the bit for parity correction satisfies the predetermined condition.

9. A wireless-tag reading apparatus, comprising:
   a reader that reads tag information written to a wireless tag, the tag information including a first bit string in which the number of bits indicating a predetermined binary value of all bits of the first bit string to be written satisfies a predetermined condition, the first bit string including a second bit string indicating a unique serial number of the first bit string, the second bit string being determined in accordance with the number of bits indicating the predetermined binary value of the bits of the first bit string;
   a memory that stores the predetermined binary value and the predetermined condition; and
   a processor configured to
      count, in the first bit string of the tag information read by the reader, the number of bits indicating the predetermined binary value stored in the memory, and
      determine, where the counted number of bits fails to satisfy the predetermined condition stored in the memory, that the tag information read from the wireless tag is invalid.

10. A wireless-tag writing method for a wireless-tag writing apparatus that writes tag information to a wireless tag, comprising:
   receiving, via a communication interface, tag information to be written to the wireless tag, the tag information including a first bit string to which a plurality of bit strings is coupled, the first bit string including a second bit string indicating a unique serial number;
   storing, in a memory in advance, a predetermined binary value included in the first bit string and a predetermined condition regarding the number of predetermined binary values included in the first bit string;

counting, in the first bit string of the tag information to be written received via the communication interface, the number of bits indicating the predetermined binary value stored in the memory;

determining, in accordance with the counted number of bits, the second bit string such that the number of bits indicating the predetermined binary value of all bits of the first bit string satisfies the predetermined condition stored in the memory, and issuing tag information including the first bit string that includes the determined second bit string; and writing the issued tag information including the first bit string to the wireless tag.

* * * * *